United States Patent
Watano et al.

(10) Patent No.: US 10,139,535 B2
(45) Date of Patent: Nov. 27, 2018

(54) LIGHT POLARIZATION FILM, METHOD FOR MANUFACTURING SAME, LAMINATE, AND METHOD FOR MANUFACTURING SAME

(71) Applicant: FUJIFILM Corporation, Tokyo (JP)

(72) Inventors: Akiko Watano, Kanagawa (JP); Toshio Hara, Kanagawa (JP); Hideaki Ito, Kanagawa (JP); Yukito Saitoh, Kanagawa (JP); Yujiro Yanai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 9 days.

(21) Appl. No.: 15/388,569

(22) Filed: Dec. 22, 2016

(65) Prior Publication Data

US 2017/0102490 A1 Apr. 13, 2017

Related U.S. Application Data (63) Continuation of application No. PCT/JP2015/066917, filed on Jun. 11, 2015.

(30) Foreign Application Priority Data

Jun. 27, 2014 (JP) ................................ 2014-133231

(51) Int. Cl.
*G02B 5/30* (2006.01)
*G02B 27/28* (2006.01)
(Continued)

(52) U.S. Cl.
CPC .............. *G02B 5/3025* (2013.01); *B32B 7/02* (2013.01); *B32B 27/08* (2013.01); *B32B 27/18* (2013.01);
(Continued)

(58) Field of Classification Search
CPC ........ G02B 5/3025; G02B 27/28; C08J 5/005; C08J 5/18; C08J 2367/02
(Continued)

(56) References Cited

U.S. PATENT DOCUMENTS

2006/0204679 A1* 9/2006 Jones ..................... B82Y 20/00
428/1.3
2007/0042137 A1* 2/2007 Rao ........................ B82Y 30/00
428/1.3
(Continued)

FOREIGN PATENT DOCUMENTS

JP 2002-502503 A 1/2002
JP 2006-285068 A 10/2006
(Continued)

OTHER PUBLICATIONS

International Search Report issued in PCT/JP2015/066917 dated Sep. 15, 2015.
(Continued)

*Primary Examiner* — Frank G Font
(74) *Attorney, Agent, or Firm* — Edwrds Neils LLC; Jean C. Edwards, Esq.

(57) ABSTRACT

The present invention provides a light polarization film capable of suppressing a decrease in light emission efficiency even when the film is continuously irradiated with light and suppressing a change in degree of polarization even under a wet heat environment, a method for manufacturing the same, a laminate, and a method for manufacturing the same. The light polarization film of the present invention includes a polymer, and quantum rods, in which the quantum rods are aligned such that a major axis of each of the quantum rods is parallel to one direction parallel to a surface
(Continued)

of the light polarization film, a moisture content is 1.0% or less, and an oxygen permeability coefficient is 200 cc·20 µm/m²·day·atm or less.

6 Claims, 1 Drawing Sheet

(51) Int. Cl.
    *B32B 7/02*         (2006.01)
    *C08J 5/18*         (2006.01)
    *B32B 27/08*       (2006.01)
    *B32B 27/18*       (2006.01)
    *B32B 27/24*       (2006.01)
    *B32B 27/28*       (2006.01)
    *B32B 27/30*       (2006.01)
    *B32B 27/32*       (2006.01)
    *B32B 27/36*       (2006.01)

(52) U.S. Cl.
    CPC ............ *B32B 27/24* (2013.01); *B32B 27/283* (2013.01); *B32B 27/302* (2013.01); *B32B 27/304* (2013.01); *B32B 27/308* (2013.01); *B32B 27/32* (2013.01); *B32B 27/36* (2013.01); *B32B 27/365* (2013.01); *C08J 5/18* (2013.01); *G02B 27/28* (2013.01); *B32B 2250/02* (2013.01); *B32B 2250/24* (2013.01); *B32B 2264/102* (2013.01); *B32B 2264/12* (2013.01); *B32B 2307/42* (2013.01); *B32B 2307/422* (2013.01); *B32B 2307/50* (2013.01); *B32B 2307/51* (2013.01); *B32B 2307/516* (2013.01); *B32B 2307/724* (2013.01); *B32B 2307/732* (2013.01); *C08J 2367/02* (2013.01); *G02B 5/3083* (2013.01)

(58) Field of Classification Search
USPC ............ 359/483.01, 485.05, 487.03; 349/96
See application file for complete search history.

(56) References Cited

U.S. PATENT DOCUMENTS

| | | | |
|---|---|---|---|
| 2007/0217008 A1* | 9/2007 | Wang | G02B 5/1809 359/485.05 |
| 2009/0052029 A1 | 2/2009 | Dai et al. | |
| 2011/0017963 A1* | 1/2011 | Wu | B82Y 30/00 252/587 |
| 2012/0206804 A1* | 8/2012 | Nam | G02F 1/133528 359/485.03 |
| 2015/0017386 A1* | 1/2015 | Kolb | C08J 7/047 428/149 |
| 2017/0123267 A1* | 5/2017 | Yanai | G02F 1/133536 |
| 2018/0105957 A1* | 4/2018 | Dang | C08K 3/042 |

FOREIGN PATENT DOCUMENTS

| | | |
|---|---|---|
| JP | 2006-323119 A | 11/2006 |
| JP | 2009-058620 A | 3/2009 |
| JP | 2013-076874 A | 4/2013 |
| JP | 2013-121521 A | 6/2013 |
| JP | 2013-129780 A | 7/2013 |
| JP | 2013-166278 A | 8/2013 |
| JP | 2014-502403 A | 1/2014 |
| WO | 2013/046130 A1 | 4/2013 |

OTHER PUBLICATIONS

International Preliminary Report on Patentability issued by WIPO dated Jan. 5, 2017, in connection with International Patent Application No. PCT/JP2015/066917.
Notification of Reasons for Refusal, issued by the Japanese Patent Office dated Feb. 20, 2018, in connection with corresponding Japanese Patent Application No. 2014-133231.
Notification of Reasons for Refusal, issued by the Japanese Patent Office dated Sep. 26, 2017, in connection with corresponding Japanese Patent Application No. 2014-133231.
Office Action issued by the State Intellectual Property office of People's Republic of China dated Jul. 4, 2018, in connection with Chinese Patent Application No. 201580034851.0.

* cited by examiner

LIGHT POLARIZATION FILM, METHOD FOR MANUFACTURING SAME, LAMINATE, AND METHOD FOR MANUFACTURING SAME

CROSS-REFERENCE TO RELATED APPLICATIONS

This application is a Continuation of PCT International Application No. PCT/JP2015/066917 filed on Jun. 11, 2015, which was published under PCT Article 21(2) in Japanese, and which claims priority under 35 U.S.C. § 119(a) to Japanese Patent Application No. 2014-133231 filed on Jun. 27, 2014. The above applications are hereby expressly incorporated by reference, in their entirety, into the present application.

BACKGROUND OF THE INVENTION

1. Field of the Invention

The present invention relates to a light polarization film, a method for manufacturing the same, a laminate, and a method for manufacturing the same.

2. Description of the Related Art

Polarization characteristics of light are utilized in various display devices such as televisions, computers, and mobile phones. Since the light that is generated from a light source is usually not polarized, a polarizer is used to obtain polarized light in many cases. However, in an embodiment of obtaining specific polarized light using a polarizer, there is usually accompanying energy loss and about 50% of incidence rays is lost.

Regarding the above problem, in recent years, an embodiment using quantum rods has been proposed. Since a quantum rod is a fine particle of a rod-like semiconductor compound (semiconductor nanocrystal) and has a rod-like shape and directivity, the quantum rod emits polarized light. For example, JP2014-502403A discloses an embodiment in which pumping light is emitted to an optically active structure including quantum rods aligned in one direction to obtain polarized light. The embodiment is useful as a backlight system for a display device. In the description of Examples of JP2014-502403A, specifically, polyvinyl butyral is used as a matrix material for dispersing the quantum rods.

SUMMARY OF THE INVENTION

On the other hand, as described above, in order to apply a light polarization film including quantum rods and emitting polarized light to a display device, various characteristics have to be satisfied.

For example, in order to make a display device usable continuously for a long period of time, even when the quantum rods are continuously irradiated with the light that is emitted from a light source (pumping light), it is desirable that a decrease in light emission efficiency from the quantum rods is small. In addition, in order to make the display device operate normally under a wet heat environment, it is desirable that the polarization characteristics from the light polarization film are maintained even under a wet heat environment.

When the present inventors manufactured a light polarization film disclosed in JP2014-502403A using polyvinyl butyral as a matrix for quantum rods to evaluate the characteristics thereof and the film was left to stand for a predetermined period of time under a wet heat environment to measure the degree of polarization, it was confirmed that the degree of polarization changed significantly.

On the other hand, when a light polarization film was manufactured using an alicyclic olefin polymer (COP), which is excellent in moisture-heat resistance and is generally used for an optical film, as a matrix for quantum rods to evaluate the characteristics thereof, it was confirmed that a decrease in the degree of polarization under a wet heat environment was very small but in the case in which the light polarization film was continuously irradiated with pumping light, the light emission efficiency from the quantum rods after continuous irradiation decreased.

The present invention is made in consideration of the above circumstances and an object of the present invention is to provide a light polarization film capable of suppressing a decrease in light emission efficiency even when the film is continuously irradiated with light and suppressing a change in degree of polarization under a wet heat environment.

In addition, the present invention is for providing a method for manufacturing the light polarization film, a laminate including the light polarization film, and a method for manufacturing the same.

As a result of intensive investigations of problems of the related art, the present inventors have found that the above problems can be solved by using a light polarization film satisfying predetermined characteristics.

That is, it has been found that the above object can be achieved by adopting the following configurations.

(1) A light polarization film comprising:
a polymer; and
quantum rods,
in which the quantum rods are aligned such that a major axis of each of the quantum rods is parallel to one direction parallel to a surface of the light polarization film (a predetermined direction),
a moisture content is 1.0% or less, and
an oxygen permeability coefficient is 200 cc·20 µm/m$^2$·day·atm or less.

(2) The light polarization film according to (1), in which the polymer includes polyethylene terephthalate or polyethylene naphthalate.

(3) A laminate comprising:
a support; and
the light polarization film according to (1) or (2) that is arranged on the support.

(4) The laminate according to (3), in which the support includes polyethylene terephthalate or polyethylene naphthalate.

(5) A method for manufacturing the light polarization film according to (1) or (2) comprising:
a step of melting a mixture including a polymer and quantum rods and forming a film to obtain a polymer film; and
a step of stretching the polymer film in one direction to obtain a light polarization film.

(6) A method for manufacturing the light polarization film according to (1) or (2) comprising:
a step of applying a mixture including a polymer, quantum rods, and a solvent to a support to form a coating film including the polymer and the quantum rods on the support;
a step of stretching the support and the coating film together in one direction to obtain a laminate including the support and the light polarization film that is arranged on the support; and a step of removing the support from the laminate to obtain a light polarization film.

(7) A method for manufacturing the laminate according to (3) or (4) comprising:

a step of applying a mixture including a polymer, quantum rods, and a solvent to the support to form a coating film including the polymer and the quantum rods on the support; and a step of stretching the support and the coating film together in one direction to obtain the laminate.

According to the present invention, it is possible to provide a light polarization film capable of suppressing a decrease in light emission efficiency even when the film is continuously irradiated with light and suppressing a change in degree of polarization under a wet heat environment.

In addition, according to the present invention, it is also possible to provide a method for manufacturing the light polarization film, a laminate including a light polarization film, and a method for manufacturing the same.

DESCRIPTION OF THE PREFERRED EMBODIMENTS

Hereinafter, the present invention will be described in detail. The following description of the constitutional requirements is made on the basis of representative embodiments of the present invention, but it should not be construed that the present invention is limited to those embodiments. The numerical range which is shown by "to" used in the present specification means the range including the numerical values described before and after "to" as the lower limit and the upper limit, respectively.

In addition, in the present specification, the angles (for example, an angle of "90°" or the like) and relationships thereof (for example, "parallel", "orthogonal", or the like) should be interpreted so as to include errors allowable within the technical field to which the present invention belongs. For example, this means that the angle falls within a range of an exact angle ±20° or less, preferably within a range of an exact angle ±5° or less, and more preferably within a range of an exact angle ±3° or less. For example, in the case of being parallel, the angle may fall within a range of 0°±20° (−20° to 20°).

One characteristic of the light polarization film of the present invention is that the light polarization film exhibits predetermined moisture content and oxygen permeability coefficient. When the present inventors reviewed the reason for not obtaining a desired effect in the related art, it was found that first, a decrease in light emission efficiency of quantum rods is caused by the effect of oxygen. That is, it was found that oxygen gradually permeates into the light polarization film and thus light emission from the quantum rods is inhibited. In the present invention, the above problem can be solved by adjusting the oxygen permeability coefficient of the light polarization film to fall within a predetermined range. In addition, it was found that regarding the cause of decreasing the degree of polarization when the film is left to stand still under a wet heat environment, when the light polarization film is left to stand still under a wet heat environment, water permeates into the light polarization film to cause the quantum rods to be easily movable and as a result, the alignment of the quantum rods is decreased, thereby decreasing the degree of polarization. In the present invention, the above problem is solved by determining the moisture content of the light polarization film.

Figure 1:
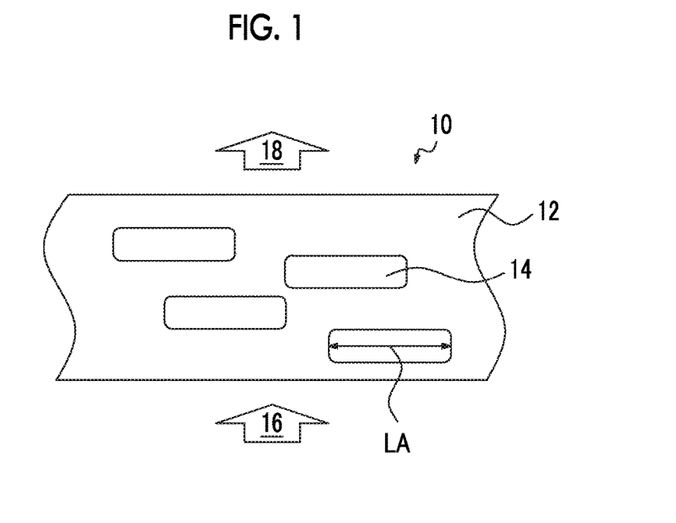
FIG. 1 is a cross-sectional view showing an embodiment of a light polarization film.

Hereinafter, preferable embodiments of the light polarization film and the laminate including the light polarization film according to the present invention will be described with reference to drawings. FIG. 1 is a cross-sectional view showing an embodiment of a light polarization film of the present invention. The drawings in the present invention are schematic views and the thickness and positional relationships between each layer do not necessarily match actual thickness and positional relationships. The same will be applied to the following drawing.

A light polarization film 10 includes a polymer 12 that functions as a matrix and plural quantum rods 14 that are dispersed in the polymer 12. The quantum rods 14 are aligned such that the major axis LA of each of the quantum rods 14 is parallel to one direction parallel to the surface of the light polarization film 10 (in-plane direction) (one direction orthogonal to the thickness direction of the light polarization film 10). In other words, the quantum rods 14 are aligned such that the major axis LA of each of the quantum rods 14 is parallel to the surface of the light polarization film 10 and the major axes LA of the plural quantum rods 14 are parallel to each other. When incidence rays 16 are incident to the quantum rods 14 in such a light polarization film 10, polarized light 18 is emitted from the quantum rods 14. That is, the light polarization film 10 is a film for emitting polarized light by excitation light being incident.

Figure 2:
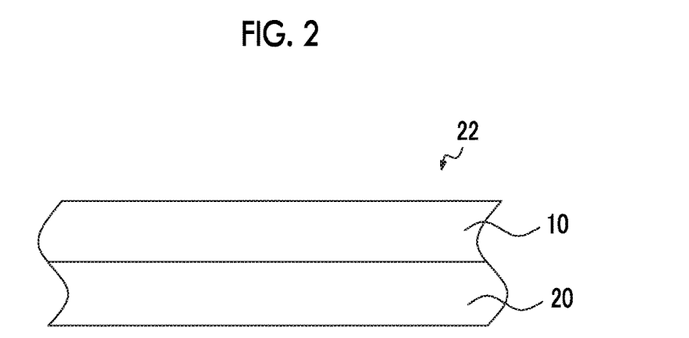
FIG. 2 is a cross-sectional view showing an embodiment of a laminate.

In addition, as shown in FIG. 2, the light polarization film 10 may be arranged on a support 20 and may constitute a laminate 22.

Hereinafter, each member for constituting the light polarization film and the laminate will be described in detail and then the methods for manufacturing the light polarization film and the laminate will be described in detail.

<Polymer>

The light polarization film includes a polymer and functions as a matrix for dispersing quantum rods.

The type of the polymer is not particularly limited as long as the light polarization film exhibits predetermined moisture content and oxygen permeability coefficient. For example, polyester-based resins (for example, polyethylene terephthalate, and polyethylene naphthalate), (meth)acrylic resins, polyvinyl chloride-based resin, and polyvinylidene chloride-based resins. Among these, from the viewpoint of satisfying at least one of the point of further suppressing a decrease in light emission efficiency or the point of further suppressing a decrease in degree of polarization under a wet heat environment (hereinafter, also simply referred to as "from the viewpoint of achieving further excellent effect of the present invention"), polyester-based resins are preferable and polyethylene terephthalate and polyethylene naphthalate are more preferable.

One preferable embodiment of the polymer includes a polymer having a modulus of elasticity of 1,000 MPa or more. The range of the modulus of elasticity is more preferably 3,000 MPa or more. Although the upper limit is not particularly limited, the upper limit is 10,000 MPa or less in many cases.

In the case in which the modulus of elasticity of the polymer is within the above range, even when stress is applied to the light polarization film, the stretching or deflection of the film is further suppressed. Thus, the alignment disorder of the quantum rods is not easily caused and the degree of polarization or the like does not easily change so that unevenness is hardly formed.

The modulus of elasticity is measured by a method according to JIS K 7161.

From the viewpoint of achieving further excellent effect of the present invention, as the polymer, similar to the light polarization film, which will be described later, a polymer having a moisture content of 1% or less and an oxygen permeability coefficient of 200 cc·20 µm/m²·day·atm or less may be used.

The measurement methods of the moisture content and the oxygen permeability coefficient will be described later in detail.

In addition, preferable ranges of the moisture content and the oxygen permeability coefficient of the polymer are the same as preferable ranges of the moisture content and the oxygen permeability coefficient of the light polarization film, which will be described later.

<Quantum Rod>

The quantum rod is also referred to as a semiconductor nanorod and is a rod-like semiconductor nanocrystal (nanoparticle). The quantum rod is formed into a rod-like shape and has directivity. Thus, when light emitted from a light source is incident to the quantum rod, polarized light is emitted. That is, the quantum rod is excited by excitation light being incident and emits fluorescence.

As shown in FIG. 1, the plural quantum rods 14 in the light polarization film 10 are aligned and dispersed such that the major axis LA of each of the quantum rods 14 is parallel to one direction parallel to the surface of the light polarization film 10 (in one direction orthogonal to the thickness direction of the light polarization film 10). In other words, the quantum rods 14 are dispersed in the polymer 12 such that the major axes LA of the quantum rods 14 are parallel to the in-plane direction of the light polarization film 10 and aligned in the same direction. Incidentally, the plural quantum rods 14 are aligned such that the major axes LA of the quantum rods 14 are parallel to each other. The definitions of being orthogonal and parallel are as described above. As described above, when the quantum rods are aligned in a predetermined direction, light linearly polarized in a certain desired vibration direction can be emitted.

Although the method of confirming the direction of the major axes of the quantum rods is not particularly limited, usually, the direction can be confirmed by observing the cross section of the light polarization film using a microscope (for example, transmission electron microscope).

In addition, although the alignment direction of the quantum rods is not particularly limited, as described later, in the case of manufacturing the light polarization film by a stretching treatment, usually, the quantum rods are aligned such that the a major axis of each of the quantum rods is parallel to the stretching direction. That is, the above "one direction" corresponds to the stretching direction. Incidentally, within a range not impairing the effect of the present invention, the light polarization film may include quantum rods whose major axes are not parallel to a predetermined direction.

The quantum rods may be used alone or in combination of two or more types.

In the case in which two or more quantum rods are used in combination, two or more quantum rods having different wavelengths of emitted light may be used.

The shape of the quantum rods may be a shape extending in one direction (rod-like shape), and a so-called cylindrical shape, quadrangular prism shape (preferably, rectangular parallelepiped shape), triangular prism shape, hexagonal columnar shape, or the like may be adopted.

Although the average length of the quantum rods (the average length in the major axis direction: average major axis length) is not particularly limited, from the viewpoint of achieving excellent light emission characteristics and/or achieving further excellent effect of the present invention, the average length is preferably 8 to 500 nm and more preferably 10 to 160 nm.

The average length is a value obtained by measuring the major axis lengths of 20 or more quantum rods, which are arbitrarily selected, with a microscope (for example, transmission electron microscope) and obtaining an arithmetic average value of these measured values.

In addition, the major axis of the quantum rod refers to a line segment which is the longest line segment that crosses the quantum rod in a two-dimensional image of the quantum rod obtained by observing the quantum rod with a microscope (for example, transmission electron microscope). The minor axis refers to a line segment which is orthogonal to the major axis and is the longest line segment that crosses the quantum rod.

Although the average minor axis length of the quantum rods (average value of the minor axis) is not particularly limited, from the viewpoint of achieving excellent light emission characteristics and/or achieving further excellent effect of the present invention, the average length is preferably 0.3 to 20 nm and more preferably 1 to 10 nm.

The average minor axis length is a value obtained by measuring the diameters of 20 or more quantum rods, which are arbitrarily selected, with a microscope (for example, transmission electron microscope) and obtaining an arithmetic average value of these measured values.

Although the aspect ratio of the quantum rods (major axis of quantum rod/minor axis of quantum rod) is not particularly limited, from the viewpoint of achieving excellent light emission characteristics and/or achieving further excellent effect of the present invention, the aspect ratio is preferably 1.5 or more and more preferably 3.0 or more. The upper limit is not particularly limited and from the viewpoint of ease of handling, the upper limit is 20 or less in many cases.

The aspect ratio is an average value obtained by measuring aspect ratios of 20 or more quantum rods, which are arbitrarily selected, with a microscope (for example, transmission electron microscope) and obtaining an arithmetic average value of these measured values.

The material constituting the quantum rods is not particularly limited, and is usually formed of a semiconductor, for example, II-VI semiconductors, III-V semiconductors, IV-VI semiconductors, or combinations thereof. More specifically, a material selected from CdS, CdSe, CdTe, ZnS, ZnSe, ZnTe, ZnO, GaAs, GaP, GaAs, GaSb, HgS, HgSe, HgTe, InAs, InP, InSb, AlAs, AlP, AlSb, $Cu_2S$, $Cu_2Se$, $CuInS_2$, $CuInSe_2$, $Cu_2(ZnSn)S_4$, $Cu_2(InGa)S_4$, $TiO_2$ alloys thereof, and mixtures thereof may be used.

The quantum rod may be a quantum rod consisting of a single component or may be a core/shell quantum rod having a core of a first semiconductor and a shell of a second semiconductor. A core/multiple shell quantum rod may be used or a quantum rod having a core/shell structure in which the shell has a stepwise composition may be used.

A ligand may be coordinated on the surface of the quantum rod if required. Examples of the ligand include phosphines and phosphine oxides such as trioctylphosphine oxide (TOPO), trioctylphosphine (TOP), and tributylphosphine (TBP); phosphonic acids such as dodecylphosphonic acid (DDPA), tridecylphosphonic acid (TDPA), and hexylphosphonic acid (HPA); amines such as dodecyl amine (DDA), tetradecyl amine (TDA), hexadecyl amine (HAD), and octadecyl amine (ODA); thiols such as hexadecanethiol and hexanethiol; and mercaptocarboxylic acids such as mercaptopropionic acid and mercaptoundecanoic acid.

As described above, the light polarization film can also include two or more quantum rods having different light emission characteristics. As a specific embodiment of the quantum rods, for example, a quantum rod A having a light emission center wavelength in a wavelength band ranging from 600 nm to 680 nm, a quantum rod B having a light emission center wavelength in a wavelength band ranging from 500 nm to 600 nm and, a quantum rod C having a light emission center wavelength in a wavelength band of 400 nm to 500 nm, and the like may be adopted. The quantum rod A emits red light when excited by excitation light, the quantum rod B emits green light, and the quantum rod C emits blue light. For example, when blue light is incident to the light polarization film including the quantum rod A and the quantum rod B as excitation light, white light can be realized by red light that is emitted from the quantum rod A, the green light that is emitted from the quantum rod B, and blue light that is transmitted through the light polarization film. Alternatively, by making ultraviolet light incident to the light polarization film including the quantum rods A, B, and C as excitation light, white light can be realized by red light that is emitted from the quantum rod A, green light that is emitted from the quantum rod B, and blue light that is emitted from the quantum rod C. As the quantum rods, those prepared by known methods can be used without any limitation. The emission wavelength of the quantum rods can be usually adjusted by controlling the composition, the size, and the composition and size of the particles.

<Light Polarization Film>

The light polarization film includes the above-described polymer and the quantum rods dispersed in the polymer.

The moisture content of the light polarization film is 1.0% or less, and from the viewpoint of achieving further excellent effect of the present invention, the moisture content is preferably 0.5% or less and more preferably 0.1% or less. The lower limit is not particularly limited and the lower limit is 0.001% or more in many cases.

In the case in which the moisture content is more than 1.0%, a change in degree of polarization under a wet heat environment is significant.

The moisture content is a value obtained by using the light polarization film and measuring the water content according to ISO 62 Method 1 after immersing the film in water at 23° C. for 24 hours.

The oxygen permeability coefficient of the light polarization film is 200 (cc·20 μm/m²·day·atm) or less, and from the viewpoint of achieving further excellent effect of the present invention, the oxygen permeability coefficient is preferably 50 (cc·20 μm/m²·day·atm) or less and more preferably 10 (cc·20 μm/m²·day·atm) or less. The lower limit is not particularly limited and the lower limit is 0.01 (cc·20 μm/m²·day·atm) or more in many cases.

In the case in which the oxygen permeability coefficient is more than 200 (cc·20 μm/m²·day·atm), the light emission efficiency of the quantum rods after being continuously irradiated with light easily decreases.

The oxygen permeability coefficient is measured by a method according to JIS K 7126 (differential pressure method). The measurement is carried out under the conditions of a temperature of 23° C. and a relative humidity of 50%. The oxygen permeability coefficient (cc·20 μm/m²·day·atm) refers to an amount of gas, which permeates the film, based on 1 m² film area and 1 atm pressure for a day (24 hours) when the thickness of the light polarization film is set to 20 μm.

Although the modulus of elasticity of the light polarization film is not particularly limited, the modulus of elasticity is preferably 1,000 MPa or more and more preferably 3,000 MPa or more. The upper limit is not particularly limited and the upper limit is 10,000 MPa or less in many cases.

In the case in which the modulus of elasticity of the light polarization film is within the above range, even when stress is applied to the light polarization film, the stretching or deflection of the film is further suppressed. Thus, the alignment disorder of the quantum rods is not easily caused and the degree of polarization or the like does not easily change so that unevenness is hardly formed.

The modulus of elasticity is measured by a method according to JIS K 7161.

The light polarization film includes at least the above-described polymer and quantum rods. Although the content of the quantum rod included in the light polarization film is not particularly limited, from the viewpoint of achieving further excellent dispersibility and light emission characteristics, the content is preferably 0.1 to 30 parts by mass and more preferably 0.5 to 25 parts by mass with respect to 100 parts by mass of the polymer.

Although the film thickness of the light polarization film is not particularly limited, form the viewpoint of handleability and light emission characteristics, the film thickness is preferably 5 to 200 μm and more preferably 10 to 150 μm.

In the present specification, the above film thickness refers to an average thickness and the average thickness is obtained by measuring the thicknesses of the light polarization film at 10 points or more and obtaining an arithmetic average value of these measured values.

As shown in FIG. 2, the light polarization film 10 may be arranged on the support 20. By arranging the light polarization film on the support, the mechanical strength of the light polarization film can be reinforced. In addition, in the case of subjecting the support to a stretching treatment as described later, the support is preferably a support having stretchability (stretchable support).

The type of the support is not particularly limited and known supports can be used. The material constituting the support is not particularly limited and examples thereof include polyester-based resins (for example, polyethylene terephthalate, a polyethylene naphthalate), polyolefin-based resins (for example, polyethylene, and polypropylene), polystyrene-based resins, polycarbonate-based resins, (meth) acrylic resins, silicone-based resins, polyvinyl chloride-based resins, and polyvinylidene chloride-based resins. Among these, from the viewpoints of excellent mechanical strength and ease of application to a stretching treatment, which will be described later, polyester-based resins are preferable and polyethylene terephthalate and polyethylene naphthalate are more preferable.

Although the film thickness of the support is not particularly limited, from the viewpoint of hardenability, the film thickness is preferably 20 to 200 μm and more preferably 30 to 150 μm.

In the present specification, the above film thickness refers to an average thickness and the average thickness is obtained by measuring the thicknesses of the support at 10 points or more and obtaining an arithmetic average value of these measured values.

Method for Manufacturing Light Polarization Film

Preferable Embodiment (Part 1)

One preferable embodiment of the method for manufacturing the light polarization film includes a manufacturing method including Step A of obtaining a polymer film and Step B of subjecting the film to a stretching treatment.

Hereinafter, the procedures of each step will be described in detail.

(Step A: Film Forming Step)

Step A is a step of melting a mixture including a polymer and quantum rods and forming a film to obtain a polymer film. The polymer film obtained in this step is a film in an unstretched state and each major axis of the quantum rods in the polymer film is directed to a random direction and is not aligned.

The definitions of the polymer and the quantum rods used in the step are as described above.

The mixing ratio (mass ratio) between the polymer and the quantum rod in the mixture is not particularly limited and is preferably within the above-described range of the mixing ratio of the polymer and the quantum rod in the light polarization film.

The melting film formation is a method of melting the mixture, extruding the molten material from an extruder, and cooling the resultant to obtain a film. Hereinafter, an example of procedure of melting film formation will be described.

(Drying)

First, before melting the mixture, if required, the mixture may be dried.

(Melting Extrusion)

Next, the mixture is supplied into a cylinder through a feed port of an extruder, followed by kneading and melting. Usually, the cylinder includes a supply part (Area A), a compression part (Area B), and a measuring part (Area C) sequentially from the feed port. The screw compression ratio of the extruder is preferably 1.5 to 4.5. The ratio of the length of the cylinder with respect to the inner diameter of the cylinder (L/D) is preferably 20 to 70, and the inner diameter of the cylinder is preferably 30 to 150 mm. The extrusion temperature is preferably 190° C. to 350° C. Further, in order to prevent oxidation of the molten resin due to residual oxygen, it is preferable that extrusion is carried out while evacuating the inside of the extruder in an inert (nitrogen or the like) gas stream or using an extruder with a vent.

In order to filter foreign substances in the mixture, it is preferable to provide a filter formed by combining breaker plate type filter or a leaf type disc filter. The filtration can be carried out in one stage or multiple stages. The filtration accuracy is preferably 3 to 15 µm and more preferably 3 to 10 µm.

In order to improve the thickness accuracy by decreasing a variation of the ejection amount, it is preferable to provide a gear pump between the extruder and the die.

The mixture is melted by the extruder having the above configuration and if required, the molten resin is continuously fed to the die via the filter and the gear pump. Any type of die may be used among a T die, a fishtail die, and a hanger coat die.

(Cast)

The molten material (melt) extruded into a sheet from the die is cooled and fixed on a cast drum to obtain a film.

When the melt contacts the cast drum, it is preferable to improve adhesion between the cast drum and the melt using an electrostatic application method, an air knife method, an air chamber method, a vacuum nozzle method, a touch roll method, and the like. Among these, a touch roll method is preferable. Such an adhesion improving method may be carried out on the entire surface or a part of the melt.

Then, it is possible to peel off the film from the cast drum to obtain a polymer film.

(Step B: Stretching Step)

Step B is a step of stretching the polymer film obtained in Step A in one direction to obtain a light polarization film. By carrying out the step, the quantum rods are aligned in the polymer film such that the major axis of each of the quantum rods is parallel to the stretching direction (the a major axis of each of the quantum rods is aligned in the stretching direction) and thus a desired light polarization film is obtained. The stretching treatment is usually carried out in the in-plane direction of the polymer film and as described above, the quantum rods are aligned such that the a major axis of each of the quantum rods is parallel to the surface of the light polarization film (in-plane direction) (orthogonal to the thickness direction of the light polarization film).

The method for the stretching treatment is not particularly limited and usually, as the stretching treatment, uniaxial stretching is preferably carried out. For uniaxial stretching, any of longitudinal stretching that is carried out on the polymer film in the longitudinal direction polymer and transverse stretching that is carried out on the polymer film in the width direction can be adopted. It is preferable that the polymer film is stretched by transverse stretching. In the transverse stretching, while stretching the film in the width direction, the film can contract in the longitudinal direction. Examples of the transverse stretching method include a fixed end uniaxial stretching method of fixing one end with a tenter and a free end uniaxial stretching method of not fixing one end. Examples of the longitudinal stretching method include an inter-roll stretching method, a compression stretching method, and a stretching method using a tenter. The stretching treatment can be carried out in multiple stages. In addition, the stretching treatment can be carried out by biaxial stretching, diagonal stretching, and the like.

In addition, for the stretching treatment, any of a wet type stretching method and a dry stretching method can be adopted. However, in the present invention, it is preferable to use a dry stretching method from the viewpoint that the temperature range when the polymer film is stretched can be set to be wide.

In the dry stretching method, usually, a stretching treatment is carried out in a state in which the polymer film is heated (preheated) to about 50° C. to 200° C. and preferably 80° C. to 180° C.

The degree of stretching in the stretching process is not particularly limited but the stretching ratio with respect to the original length (total length) of the polymer film (length after stretching/length before stretching) is preferably within a range of 1.5 to 17 times and more preferably within a range of 1.5 to 10 times.

After the stretching treatment, it is preferable to cool the obtained film. The film is preferably cooled to about 10° C. to 70° C. Such cooling may be carried out by contacting the film with a cooling roll or blowing cool air.

After the stretching treatment, if required, a heat fixation treatment and/or a heat relaxation treatment may be carried out.

In the heat fixation treatment, microcrystals are formed in the film by subjecting the film to a heat treatment and dynamic characteristics and durability can be improved. The conditions for the heat fixation treatment are not particularly limited but the heat treatment is preferably carried out at about 170° C. to 210° C. (preferably at 180° C. to 200° C.) for 1 to 60 seconds (preferably for 2 to 30 seconds). The heat fixation treatment is preferably carried out in a state in which the film is gripped by the chuck in the tenter subsequent to stretching.

The heat relaxation treatment is a treatment by applying heat to the film for relaxing stress so as to cause the film to contract. The relaxation temperature is preferably Tg+50° C. to Tg+180° C. and more preferably Tg+60° C. to Tg+150° C. with respect to the glass transition temperature (Tg (° C.)) of the film.

Preferable Embodiment (Part 2)

Another preferable embodiment of the method for manufacturing the light polarization film includes a manufacturing method including Step C of forming a coating film including a polymer and quantum rods on a support, Step D of carrying out a stretching treatment, and Step E of obtaining a light polarization film by removing the support.

Hereinafter, the procedures of each step will be described in detail.

(Step C: Coating Film Forming Step)

Step C is a step of applying a mixture including a polymer, quantum rods, and a solvent to a support to form a coating film including a polymer and quantum rods on the support. The quantum rods in the coating film that can be obtained in the step are dispersed in a non-aligned state.

The definitions of the polymer, the quantum rods, and the support used in the step are as described above.

The mixing ratio (mass ratio) between the polymer and the quantum rod in the mixture is not particularly limited and is preferably within the above-described range of the mixing ratio of the polymer and the quantum rod in the light polarization film.

The mixture includes a solvent. The type of the solvent is not particularly limited and water or an organic solvent may be used. The type of the organic solvent is not particularly limited and examples thereof include amide-based solvents (for example, N,N-dimethylformamide), sulfoxide-based solvents (for example, dimethyl sulfoxide), heterocyclic compound-based solvents (for example, pyridine), hydrocarbon-based solvents (for example, benzene and hexane), alkyl halide-based solvents (for example, chloroform and dichloromethane), ester-based solvents (for example, methyl acetate, ethyl acetate, and butyl acetate), ketone-based solvents (for example, acetone and methyl ethyl ketone), and ether-based solvents (for example, tetrahydrofuran and 1,2-dimethoxyethane).

The content of the solvent in the mixture is preferably 50% to 95% by mass and more preferably 60% to 90% by mass with respect to the total mass of the mixture from the viewpoint of handleability of the mixture.

The method of applying the mixture to the support is not particularly limited and known methods (for example, a dip coating method, a wire bar coating method, a direct gravure coating method, a reverse gravure coating method, and a die coating method) may be adopted.

After the mixture is applied to the support, if required, a drying treatment may be carried out to remove a volatile component.

The film thickness of the formed coating film is not particularly limited and is preferably adjusted so that the film thickness of the obtained light polarization film is within the above-described preferable range.

(Step D: Stretching Step)

Step D is a step of stretching the support and the coating film together in one direction to obtain a laminate. By carrying out the step, a laminate in which the quantum rods in the coating film are aligned such that the major axis of each of the quantum rods is parallel to the stretching direction and a desired light polarization film is arranged on the support is obtained.

The method for the stretching treatment is not particularly limited and the stretching treatment described in the above Step B may be adopted.

(Step E: Support Removing Step)

Step E is a step of removing the support from the laminate obtained in Step D to obtain a light polarization film. By carrying out the step, a desired light polarization film can be obtained.

The method for removing the support is not particularly limited and a method of peeling off the support from the laminate or a method of immersing the laminate in a solvent for dissolving only the support to remove the support may be adopted.

<Method for Manufacturing Laminate>

One preferable embodiment of the method for manufacturing the laminate including the support and the light polarization film that is arranged on the support includes a manufacturing method including the following Step C and Step D:

Step C: bringing a mixture including a polymer, quantum rods, and a solvent into contact with the support to form a coating film including a polymer and quantum rods on the support; and Step D: stretching the support and the coating film together in one direction to obtain a laminate.

The procedures of Step C and Step D are the same as the procedures described in the above-described method for manufacturing the light polarization film and thus description thereof will be omitted.

<Application>

The above-described light polarization film and laminate can be applied to various applications, such as a display device (liquid crystal display device).

EXAMPLES

Hereinafter, the present invention will be more specifically described based on examples. The materials, the amount of the materials used, the ratio between the materials, the content and the procedures of treatment, and the like shown in the following examples can be appropriately modified as long as the modification does not depart from the gist of the present invention. Accordingly, the scope of the present invention is not limited to the following specific examples.

(Preparation of Quantum Rod)

With reference to U.S. Pat. No. 7,303,628B, paper (Peng, X. G.; Manna, L.; Yang, W. D.; Wickham, j.; Scher, E.; Kadavanich, A.; Alivisatos, A. P. Nature 2000, 404, 59-61), and paper (Manna, L.; Scher, E. C.; Alivisatos, A. P. j. Am. Chem. Soc. 2000, 122, 12700-12706), Quantum rod 1 which fluorescently emits green light having a center wavelength of 540 nm and a half-value width of 40 nm when blue light is incident, and Quantum rod 2 which fluorescently emits red light having a center wavelength of 645 nm and a half-value width of 30 nm were prepared. Quantum rods 1 and 2 had a rectangular parallelepiped shape and the average length (average major axis length) of the major axes of the quantum rods was 30 nm. The average major axis length of the quantum rods was confirmed with a transmission electron microscope.

Example 1

A quantum rod-containing polyethylene terephthalate (PET) film was prepared in the following manner.
—Synthesis of Raw Material Polyester—
——Raw Material Polyester 1——
As described below, a raw material polyester 1 (Sb catalyst-based PET) was obtained by a continuous polymerization apparatus using a direct esterification method including directly reacting terephthalic acid and ethylene glycol with each other, distilling water off, carrying out esterification, and then carrying out polycondensation under a reduced pressure.

(1) Esterification Reaction

In a first esterification reaction tank, 4.7 tons of high purity terephthalic acid and 1.8 tons of ethylene glycol were mixed for 90 minutes to form slurry, and the slurry was continuously supplied to the first esterification reaction tank at a flow rate of 3,800 kg/h. Further, an ethylene glycol solution of antimony trioxide was continuously supplied, and a reaction was conducted at a temperature inside the reaction tank of 250° C. for an average retention time of approximately 4.3 hours under stirring. At this time, the antimony trioxide was continuously added such that the amount of Sb added was 150 ppm in terms of an element.

This reaction product was transferred to a second esterification reaction tank, and the reaction product was allowed to react under stirring at a temperature inside the reaction tank of 250° C. for an average retention time of 1.2 hours. To the second esterification reaction tank, an ethylene glycol solution of magnesium acetate and an ethylene glycol solution of trimethyl phosphate were continuously supplied such that the amount of Mg added and the amount of P added were respectively 65 ppm and 35 ppm in terms of an element.

(2) Polycondensation Reaction

The esterification reaction product obtained as described above was continuously supplied to a first polycondensation reaction tank, and polycondensation was carried out under stirring at a reaction temperature of 270° C. and a pressure inside the reaction tank of 20 torr ($2.67 \times 10^{-3}$ MPa) for an average retention time of about 1.8 hours.

Further, the reaction product was transferred to a second polycondensation reaction tank, and in this reaction tank, a reaction (polycondensation) was conducted under stirring under the conditions of a temperature inside the reaction tank of 276° C. and a pressure inside the reaction tank of 5 torr ($6.67 \times 10^{-4}$ MPa) for an average retention time of about 1.2 hours.

Subsequently, the reaction product was further transferred to a third polycondensation reaction tank, and in this reaction tank, a reaction (polycondensation) was conducted under conditions of a temperature inside the reaction tank of 278° C. and a pressure inside the reaction tank of 1.5 torr ($2.0 \times 10^{-4}$ MPa) for an average retention time of 1.5 hours, whereby a reaction product (polyethylene terephthalate (PET)) was obtained.

Subsequently, the obtained reaction product was ejected in cold water into a strand shape, and the strands were immediately cut to prepare pellets of a polyester (cross section: major axis of about 4 mm and minor axis of about 2 mm, and length: about 3 mm). The intrinsic viscosity IV of the obtained polymer was 0.63. This polymer was used as Raw material polyester 1.

In addition, Raw material polyester 1 was dissolved in a mixed solvent of 1,1,2,2-tetrachloroethane/phenol (=2/3 [mass ratio]) and the intrinsic viscosity IV was obtained from the solution viscosity at 25° C. in the mixed solvent.
—Film Forming Step—

Raw material polyester 1 (95 parts by mass), and Quantum rod 1 (4 parts by mass) and Quantum rod 2 (1 part by mass) prepared above were dried to have a moisture content of 20 ppm or less. Then, the dried polyester was fed to into Hopper 1 of a single-screw kneading extruder 1 with a diameter of 50 mm and was melt in the extruder 1 at 300° C. The molten resin was extruded from the die under the following extrusion conditions through a gear pump and a filter (having a pore diameter of 20 μm).

The molten resin was extruded from the die under the molten resin extrusion conditions of a pressure change of 1% and a temperature distribution of 2% in the molten resin. Specifically, for the back pressure, pressure was applied by pressure 1% higher than the average pressure inside the barrel of the extruder, and for the piping temperature of the extruder, heating was performed at a temperature by 2% higher than the average temperature inside the barrel of the extruder.

The molten resin extruded from the die was extruded onto a cooling cast drum set to a temperature of 25° C. and was caused to closely adhere to the cooling cast drum by using a static electricity applying method. Unstretched quantum rod-containing polyester film 1 was obtained by peeling off the molten resin by using a peeling roll arranged opposite to the cooling cast drum.
—Transverse Stretching Step—
——Preheating Part——

By setting the preheating temperature to 90° C., Unstretched quantum rod-containing polyester film 1 was heated up to a stretchable temperature.
——Stretching Part——

Unstretched quantum rod-containing polyester film 1 preheated was transversely stretched in a TD direction (film width direction, transverse direction) under the following conditions while leading the film to a tenter (transverse stretching machine) to grip the end portion of the film with a clip. Thus, Transversely stretched quantum rod-containing polyester film 1 was obtained.

<<Conditions>>

Transverse stretching temperature: 90° C.

Transverse stretching ratio: 4.3 times
—Heat Fixation Part—

Subsequently, a heat fixation treatment was carried out while adjusting the film surface temperature of Transversely stretched quantum rod-containing polyester film 1 to the following temperature.

<<Conditions>>

Heat fixation temperature: 180° C.

Heat fixation time: 15 seconds
——Heat Relaxation Part——

Transversely stretched quantum rod-containing polyester film 1 after heat fixation was relaxed by heating the film to the following temperature.

<<Conditions>>

Heat relaxation temperature: 170° C.

Heat relaxation rate: TD direction (film width direction, transverse direction) 2%

——Cooling Part——

Subsequently, Transversely stretched quantum rod-containing polyester film 1 after heat relaxation was cooled to a cooling temperature of 50° C.

Transversely stretched quantum rod-containing polyester film 1 obtained as described above was used as a film of Example 1. The film thickness thereof was 60 μm.

Example 2

A film of Example 2 was obtained in the same manner as in Example 1 except that the raw material polyester was changed to polyethylene-2,6-naphthalate (poly(ethylenenaphthalate): PEN).

Example 3

A polyethylene terephthalate (PET) film with a quantum rod-containing layer was prepared in the following manner.
—Support Forming Step—
Raw material polyester 1 prepared in Example 1 was dried to have a moisture content of 20 ppm or less, then fed to into Hopper 1 of a single-screw kneading extruder 1 with a diameter of 50 mm, and was melt in the extruder 1 at 300° C. The molten resin was extruded from the die under the following extrusion conditions through a gear pump and a filter (having a pore diameter of 20 μm). The molten resin was extruded from the die under the molten resin extrusion conditions of a pressure change of 1% and a temperature distribution of 2% in the molten resin. Specifically, for the back pressure, pressure was applied by pressure 1% higher than the average pressure inside the barrel of the extruder, and for the piping temperature of the extruder, heating was performed at a temperature by 2% higher than the average temperature inside the barrel of the extruder.

The molten resin extruded from the die was extruded onto a cooling cast drum set to a temperature of 25° C. and was caused to closely adhere to the cooling cast drum by using a static electricity applying method. Unstretched polyester film 3 (having a film thickness of 250 μm) was obtained by peeling off the molten resin by using a peeling roll arranged opposite to the cooling cast drum.
—Preparation of Quantum Rod-Containing Layer—
A composition obtained by mixing VYLON 500 (manufactured by TOYOBO CO., LTD.) (80 parts by mass), Quantum rod 1 (16 parts by mass) and Quantum rod 2 (4 parts by mass) prepared above, and ethyl acetate (300 parts by mass) was prepared and applied to Unstretched polyester film 3 prepared above such that the film thickness after drying was 25 μm. Thus, Unstretched polyester film 3 with a quantum rod-containing layer was obtained.
—Transverse Stretching Step—
——Preheating Part——
By setting the preheating temperature to 90° C., Unstretched polyester film 3 with a quantum rod-containing layer was heated up to a stretchable temperature.
——Stretching Part——
Unstretched polyester film 3 with a quantum rod-containing layer preheated was transversely stretched in a TD direction (film width direction, transverse direction) under the following conditions while leading the film to a tenter (transverse stretching machine) to grip the end portion of the film with a clip. Thus, Transversely stretched polyester film 3 with a quantum rod-containing layer was obtained.
<<Conditions>>
Transverse stretching temperature: 90° C.
Transverse stretching ratio: 4.3 times
——Heat Relaxation Part——
Transversely stretched polyester film 3 with a quantum rod-containing layer after stretching was relaxed by heating the film to the following temperature.
<<Conditions>>
Heat relaxation temperature: 80° C.
Heat relaxation rate: TD direction (film width direction, transverse direction) 2%
——Cooling Part——
Subsequently, Transversely stretched polyester film 3 with a quantum rod-containing layer after heat relaxation was cooled to a cooling temperature of 50° C.

Transversely stretched polyester film 3 with a quantum rod-containing layer obtained as described above was used as a laminate (having a film thickness of 70 μm) of Example 3. In the laminate, a support and a light polarization film including quantum rods are included.

Comparative Example 1

—Support Forming Step—
Unstretched polyester film 4 (having a film thickness of 240 μm) was prepared in the same procedure as in the method for preparing Unstretched polyester film 3 of Example 3.
—Preparation of Quantum Rod-Containing Layer—
A composition obtained by mixing an aqueous solution of 12% by mass of polyvinyl alcohol (PVA) 124 (manufactured by KURARAY CO., LTD.) (650 parts by mass), and Quantum rod 1 (16 parts by mass) and Quantum rod 2 (4 parts by mass) prepared above was prepared and applied to Unstretched polyester film 4 prepared above such that the film thickness after drying was 30 μm. Thus, Unstretched polyester film 4 with a quantum rod-containing layer was obtained.
——Transverse Stretching Step—
——Preheating Part——
By setting the preheating temperature to 90° C., Unstretched polyester film 4 with a quantum rod-containing layer was heated up to a stretchable temperature.
——Stretching Part——
Unstretched polyester film 4 with a quantum rod-containing layer preheated was transversely stretched in a TD direction (film width direction, transverse direction) under the following conditions while leading the film to a tenter (transverse stretching machine) to grip the end portion of the film with a clip. Thus, Transversely stretched polyester film 4 with a quantum rod-containing layer was obtained.
<<Conditions>>
Transverse stretching temperature: 90° C.
Transverse stretching ratio: 4.3 times
——Heat Relaxation Part——
Transversely stretched polyester film 4 with a quantum rod-containing layer after stretching was relaxed by heating the film to the following temperature.
<<Conditions>>
Heat relaxation temperature: 80° C.
Heat relaxation rate: TD direction (film width direction, transverse direction) 2%
——Cooling Part——
Subsequently, Transversely stretched polyester film 4 with a quantum rod-containing layer after heat relaxation was cooled to a cooling temperature of 50° C.

Transversely stretched polyester film 4 with a quantum rod-containing layer obtained as described above was used as a laminate (having a film thickness of 65 μm) of Comparative Example 1. In the laminate, a support and a light polarization film including quantum rods are included.

Comparative Example 2

Pellets of thermoplastic norbornene resin, which is one type of alicyclic olefin polymer (COP), [trade name "ZEONOR 1420", manufactured by ZEON CORPORATION, glass transition point: 137° C.] were dried at 100° C. for 5 hours. The above pellets (95 parts by mass) and Quantum rod 1 (4 parts by mass) and Quantum rod 2 (1 part by mass) prepared above were fed to Hopper 1 of a single-screw kneading extruder 1 with a diameter of 50 mm, and was melt in the extruder 1. The molten resin was extruded from the die under the following extrusion conditions through a gear pump and a filter (having a pore diameter of 20 µm). The molten resin was extruded from the die under the molten resin extrusion conditions of a pressure change of 1% and a temperature distribution of 2% in the molten resin. Specifically, for the back pressure, pressure was applied by pressure 1% higher than the average pressure inside the barrel of the extruder, and for the piping temperature of the extruder, heating was performed at a temperature by 2% higher than the average temperature inside the barrel of the extruder.

The molten resin extruded from the die was extruded onto a cooling cast drum set to a temperature of 25° C. and was caused to closely adhere to the cooling cast drum by using a static electricity applying method. Unstretched quantum rod-containing COP film 5 was obtained by peeling off the molten resin by using a peeling roll arranged opposite to the cooling cast drum.

—Longitudinal Stretching Step—
——Preheating Part——

By setting the preheating temperature to 140° C., Unstretched quantum rod-containing COP film 5 was heated up to a stretchable temperature.

——Stretching Part——

Unstretched quantum rod-containing COP film 5 preheated was longitudinally stretched in a MD direction (film travelling direction, longitudinal direction) under the following conditions while leading the film to a tenter (longitudinal stretching machine). Thus, Longitudinally stretched quantum rod-containing COP film 5 was obtained.

<<Conditions>>
Longitudinal stretching temperature: 150° C.
Longitudinal stretching ratio: 3.0 times
——Heat Relaxation Part——
Longitudinally stretched quantum rod-containing COP film 5 after stretching was relaxed by heating the film to the following temperature.
<<Conditions>>
Heat relaxation temperature: 140° C.
Heat relaxation rate: MD direction (film traveling direction, longitudinal direction) 2%
——Cooling Part——
Subsequently, Longitudinally stretched quantum rod-containing COP film 5 after heat relaxation was cooled to a cooling temperature of 50° C.

Longitudinally stretched quantum rod-containing COP film 5 obtained as described above was used as a film of Comparative Example 2. The film thickness thereof was 63 µm.

Comparative Example 3

Quantum rod-containing polyvinyl butyrate (PVB) film was prepared in the following manner.

—Film Forming Step—

Polyvinyl butyrate (hereinafter, referred to as PVB, 95 parts by mass), and Quantum rod 1 (4 parts by mass) and Quantum rod 2 (1 part by mass) prepared above were dried to have a moisture content of 20 ppm or less, then fed to Hopper 1 of a single-screw kneading extruder 1 with a diameter of 50 mm, and was melt in the extruder 1. The molten resin was extruded from the die under the following extrusion conditions through a gear pump and a filter (having a pore diameter of 20 µm). The molten resin was extruded from the die under the molten resin extrusion conditions of a pressure change of 1% and a temperature distribution of 2% in the molten resin. Specifically, for the back pressure, pressure was applied by pressure 1% higher than the average pressure inside the barrel of the extruder, and for the piping temperature of the extruder, heating was performed at a temperature by 2% higher than the average temperature inside the barrel of the extruder.

The molten resin extruded from the die was extruded onto a cooling cast drum set to a temperature of 25° C. and was caused to closely adhere to the cooling cast drum by using a static electricity applying method. Unstretched quantum rod-containing PVB film 6 was obtained by peeling off the molten resin by using a peeling roll arranged opposite to the cooling cast drum.

—Transverse Stretching Step—
——Preheating Part——

By setting the preheating temperature to 90° C., Unstretched quantum rod-containing PVB film 6 was heated up to a stretchable temperature.

——Stretching Part——

Unstretched quantum rod-containing PVB film 6 preheated was transversely stretched in a TD direction (film width direction, transverse direction) under the following conditions while leading the film to a tenter (transverse stretching machine) to grip the end portion of the film with a clip. Thus, Transversely stretched quantum rod-containing PVB film 6 was obtained.

<<Conditions>>
Transverse stretching temperature: 110° C.
Transverse stretching ratio: 4.5 times
——Heat Relaxation Part——
Transversely stretched quantum rod-containing PVB film 6 after stretching was relaxed by heating the film to the following temperature.
<<Conditions>>
Heat relaxation temperature: 100° C.
Heat relaxation rate: TD direction (film width direction, transverse direction) 2%
——Cooling Part——
Subsequently, Transversely stretched quantum rod-containing PVB film 6 after heat relaxation was cooled to a cooling temperature of 50° C.

Transversely stretched quantum rod-containing PVB film 6 obtained as described above was used as a film of Comparative Example 3. The film thickness thereof was 60 µm.

<Evaluation of Oxygen Permeability Coefficient>

The oxygen permeability coefficient of the light polarization film in each of the films of Examples 1 and 2 and Comparative Examples 2 and 3 and the laminates of Example 3 and Comparative Example 1 was evaluated in the following manner.

Examples 1 and 2 and Comparative Examples 2 and 3: Films without Support

Each of the films prepared in Examples 1 and 2 and Comparative Examples 2 and 3 was attached to a detection part of an oxygen concentration meter, manufactured by Orbisphere Laboratories Neuchatel Sa, with silicon grease and according to the above-described method, the oxygen permeability coefficient (P) of each film was obtained from the equilibrium oxygen concentration value. The obtained oxygen permeability coefficient (P) value was evaluated based on the criteria (evaluation criteria) described later. The results are collectively shown in Table 1.

Laminates of Example 3 and Comparative Example 1: Laminate with Support

Each of the laminates prepared in Example 3 and Comparative Example 1 was attached to a detection part of an oxygen concentration meter, manufactured by Orbisphere Laboratories Neuchatel Sa, with silicon grease and according to the above-described method, the oxygen permeability (P0) per actual film thickness was obtained from the equilibrium oxygen concentration value.

In the same manner, the oxygen permeability (P1) of only the stretched supports used in Example 3 and Comparative Example 1 per actual film thickness was measured and the oxygen permeability (P2) of only the light polarization films included in the laminates prepared in Example 3 and Comparative Example 1 per actual film thickness was calculated from the following equation.

$$1/P2=(1/P0)-(1/P1)$$

Using the oxygen permeability (P2) value obtained from the above equation, the oxygen permeability coefficient (P) was obtained. The oxygen permeability coefficient was calculated from (oxygen permeability coefficient)=(oxygen permeability)×(thickness (20 μm)). The obtained oxygen permeability coefficient (P) was evaluated based on the following criteria. The results are collectively shown in Table 1.

A: P≤10[cc·20 μm/m²·day·atm]
B: 10 [cc·20 μm/m²·day·atm]<P≤200 [cc·20 μm/m²·day·atm]
C: 200 [cc·20 μm/m²·day·atm]<P≤1,000 [cc·20 μm/m²·day·atm]
D: 1,000 [cc·20 μm/m²·day·atm]<P <Evaluation of Moisture Content>

According to the ISO 62 Method 1 (a method of measuring a weight increasing rate after immersing the film in water at 23° C. for 24 hours), the moisture content w of the film of Example 1 was measured and evaluated based on the following criteria. The result is shown in Table 1.

In addition, the moisture content of each film was measured and evaluated in the same procedure as describe above except that the films of Example 2 and Comparative Examples 2 and 3 were used instead of using the film of Example 1.

Further, the moisture content (WO) of the laminate was measured in the same procedure as describe above except that the laminate of Example 3 was used instead of using the film of Example 1. In addition, the moisture content (W1) of the support was measured in the same procedure as described above except that a support obtained by stretching Unstretched polyester film 3 according to the procedure of the stretching treatment described in Example 3 was used instead of using the film of Example 1. The moisture content (W) of the light polarization film in the laminate was calculated by subtracting the moisture content (W1) of the support from the moisture content (WO) of the laminate and evaluated based on the following criteria.

Regarding the laminate obtained in Comparative Example 1, the moisture content of the light polarization film in the laminate obtained in Comparative Example 1 was calculated in the same procedure as in the case of using the laminate obtained in Example 3 above and evaluated based on the following criteria.

A: w≤0.1 [%]
B: 0.1 [%]<w≤1.0 [%]
C: 1.0 [%]<w≤5.0 [%]
D: 5.0 [%]<w

<Luminance Change Evaluation>

1. Evaluation of Initial Luminance (Before Continuous Irradiation)

The film of Example 1 was placed on a commercially available blue light source (OPSM-H150X142B, manufactured by OPTEX-FA Co., Ltd.) and the luminance (Y0) of transmitted light was measured with a luminance meter (SR3, manufactured by TOPCON CORPORATION) installed at a position of 740 mm in a direction vertical to the surface of the film.

2. Evaluation of Luminance after Continuous Irradiation

In a chamber maintained at a temperature of 25° C. and a relative humidity of 60% RH, the film of Example 1 was placed on a commercially available blue light source (OPSM-H150X142B, manufactured by OPTEX-FA Co., Ltd.) and the film of Example 1 was continuously irradiated with the blue light for 250 hours.

The luminance (Y1) of the film of Example 1 after continuous irradiation was measured in the same manner as in the description of 1. Evaluation of Luminance Before Continuous Irradiation above. The rate of change (ΔY) from the initial luminance value was calculated from the following equation and thus the obtained value was set as an index showing a change in luminance $$\Delta Y[\%]=(Y0-Y1)/Y0\times 100$$

The obtained ΔY value was used to evaluate a change in luminance based on the following criteria. When the evaluation results are A and B, it can be determined that satisfactory light emission efficiency is maintained at the end portion even after continuous irradiation.

(Evaluation Criteria)
A: ΔY<20 [%]
B: 20 [%]≤ΔY<40 [%]
C: 40 [%]≤ΔY<60[%]
D: 60 [%]≤ΔY The luminance change evaluation was carried out in the same procedure as described above except that the films of Example 2 and Comparative Examples 2 and 3, and the laminates of Example 3 and Comparative Example 1 were used instead of using the film of Example 1. The results are collectively shown in Table 1.

<Moisture-Heat Resistance Test Evaluation>

1. Degree of Polarization Before Moisture-Heat Resistance Test

Using an automatic polarizing film measuring machine VAP-7070 (manufactured by JASCO Corporation), the degree of polarization P0 of the film of Example 1 before moisture-heat resistance test was measured.

2. Degree of Polarization after Moisture-Heat Resistance Test

The film of Example 1 was left to stand still under an environment of a temperature of 60° C. and relative humidity of 90% RH for 250 hours.

The degree of polarization P1 of the film of Example 1 after moisture-heat resistance test was measured in the same manner as in the above evaluation of 1. Degree of Polarization Before Moisture-Heat Resistance Test. The rate of change (ΔP) from the initial degree of polarization was calculated from the following equation and thus the obtained value was set as an index showing a change in degree of polarization.

$$\Delta P[\%]=(P0-P1)/P0\times 100$$

A change in degree of polarization was evaluated from the obtained ΔP value based on the following criteria. When the evaluation results are A and B, it can be determined that satisfactory moisture-heat resistance is obtained.

(Evaluation Criteria)
A: ΔP<5 [%]
B: 5 [%]≤ΔP<10 [%]
C: 10 [%]≤ΔP<20 [%]
D: 20 [%]≤ΔP The moisture-heat resistance test evaluation was carried out in the same procedure as described above except that the films of Example 2 and Comparative Examples 2 and 3, and the laminates of Example 3 and Comparative Example 1 were used instead of using the film of Example 1. The results are collectively shown in Table 1.

(Quantum Rod Alignment Evaluation)

When the films and laminates prepared in each of Examples and Comparative Examples were used and the cross sections thereof in the thickness direction and in the in-plane direction were observed with a transmission electron microscope, the plural quantum rods in the light polarization film (polymer) in the films and laminates prepared in each of Examples and Comparative Examples were dispersed and aligned in the film such that the major axis of each of the quantum rods is parallel to the stretching direction. That is, the plural quantum rods were dispersed and aligned in the polymer such that the major axis of each of the quantum rods is parallel to one direction parallel to the surface of the film (in-plane direction) (one direction orthogonal to the thickness direction of the film).

In Table 1, "1" in the column of "manufacturing method" refers to a case in which the polymer film is manufactured by melting film formation, and "2" refers to a case in which a coating film is formed on a support.

In the polymer itself used in Examples, the moisture content was 1% or less and oxygen permeability coefficient was 200 cc·20 μm/m²·day·atm or less.

As shown in Table 1, it was confirmed that in the light polarization film and the laminate of the present invention, there were small changes in luminance and in degree of polarization even after moisture-heat resistance test and the desired effect was obtained.

On the other hand, in the embodiments of Comparative Examples 1 to 3 in which both predetermined oxygen permeability coefficient and moisture content were not satisfied, the desired effect was not obtained.

<Manufacturing of Liquid Crystal Display Device>

A commercially available liquid crystal display device (trade name TH-L42D2, manufactured by Panasonic Corporation) was disassembled, and the light polarization films or the laminate of Examples 1 to 3 were arranged between a backlight side polarizing plate and a backlight unit. The backlight unit was changed to the following B narrowband backlight unit and thus liquid crystal display devices of Examples 1 to 3 were manufactured. At this time, the light polarization film or the laminate and the backlight side polarizing plate were arranged such that the stretching direction of the light polarization film or the laminate and the transmission axis of the backlight side polarizing plate are parallel to each other.

The B narrowband backlight unit used includes a blue light emitting diode (B-LED, Royal Blue, manufactured by Nichia Corporation, having a main wavelength of 445 nm and a half-value width of 20 nm, also referred to as B light source below) as a light source. In addition, a reflection member that reflects light emitted from the light source and reflected by an optical sheet member is provided in the rear portion of the light source.

<Color Reproduction Range Evaluation>

The color reproduction range (NTSC ratio) of the liquid crystal display devices of Examples 1 to 3 above was measured in the method described in JP2012-3073A. The color reproduction range (NTSC ratio) of the liquid crystal display devices of Examples 1 to 3 was 100% or more and satisfactory.

EXPLANATION OF REFERENCES

10: light polarization film
12: polymer

TABLE 1

| | | Example 1 | Example 2 | Example 3 | Comparative Example 1 | Comparative Example 2 | Comparative Example 3 |
|---|---|---|---|---|---|---|---|
| Type of polymer | | PET | PEN | VYLON (polyester) | PVA | COP | PVB |
| Support | Presence or absence of support | Absence | Absence | Presence | Presence | Absence | Absence |
| | Type | — | — | PET | PET | — | — |
| Manufacturing method | | 1 | 1 | 2 | 2 | 1 | 1 |
| Light conversion film | Oxygen permeability coefficient | B | B | B | A | D | B |
| | Moisture content | B | B | B | D | A | C |
| Evaluation | Luminance Change Evaluation | B | B | B | A | D | B |
| | Moisture-Heat Resistance Test | B | B | B | D | A | C |

14: quantum rod
16: incidence rays
18: polarized light
20: support
22: laminate

What is claimed is:

1. A light polarization film comprising:
a polymer; and
quantum rods,
wherein the quantum rods are aligned such that a major axis of each of the quantum rods is parallel to one direction parallel to a surface of the light polarization film,
a moisture content is 1.0% or less,
an oxygen permeability coefficient is 200 cc·20 μm/m²·day·atm or less,
the average length of the quantum rods is 8 to 500 nm, and
the quantum rods are formed of II-VI semiconductors, III-V semiconductors, IV-VI semiconductors, or combinations thereof.

2. The light polarization film according to claim 1, wherein the polymer includes polyethylene terephthalate or polyethylene naphthalate.

3. A laminate comprising:
a support; and
the light polarization film according to claim 1 that is arranged on the support.

4. The laminate according to claim 3, wherein the support includes polyethylene terephthalate or polyethylene naphthalate.

5. A laminate comprising:
a support; and
the light polarization film according to claim 2 that is arranged on the support.

6. The laminate according to claim 5, wherein the support includes polyethylene terephthalate or polyethylene naphthalate.

* * * * *